United States Patent
Gao et al.

(10) Patent No.: US 9,889,439 B2
(45) Date of Patent: *Feb. 13, 2018

(54) HIGH LIGHT RECEIVED HEAVY OIL CATALYTIC CRACKING CATALYST AND PREPARATION METHOD THEREFOR

(75) Inventors: Xionghou Gao, Beijing (CN); Haitao Zhang, Beijing (CN); Hongchang Duan, Beijing (CN); Di Li, Beijing (CN); Xueli Li, Beijing (CN); Zhengguo Tan, Beijing (CN); Xiaoliang Huang, Beijing (CN); Jinjun Cai, Beijing (CN); Yunfeng Zheng, Beijing (CN); Chenxi Zhang, Beijing (CN); Gengzhen Cao, Beijing (CN)

(73) Assignee: PetroChina Company Limited, Beijing (CN)

( * ) Notice: Subject to any disclaimer, the term of this patent is extended or adjusted under 35 U.S.C. 154(b) by 711 days.

This patent is subject to a terminal disclaimer.

(21) Appl. No.: 14/364,652

(22) PCT Filed: Apr. 13, 2012

(86) PCT No.: PCT/CN2012/000507
§ 371 (c)(1),
(2), (4) Date: Sep. 10, 2014

(87) PCT Pub. No.: WO2013/086766
PCT Pub. Date: Jun. 20, 2013

(65) Prior Publication Data
US 2015/0011378 A1    Jan. 8, 2015

(30) Foreign Application Priority Data

Dec. 15, 2011  (CN) .......................... 2011 1 0419856

(51) Int. Cl.

| B01J 29/06 | (2006.01) |
|---|---|
| B01J 29/80 | (2006.01) |
| B01J 35/10 | (2006.01) |
| B01J 29/84 | (2006.01) |
| B01J 37/30 | (2006.01) |
| C01B 39/24 | (2006.01) |
| B01J 29/08 | (2006.01) |
| C01B 39/02 | (2006.01) |
| C10G 11/18 | (2006.01) |

(52) U.S. Cl.
CPC ............ *B01J 29/80* (2013.01); *B01J 29/088* (2013.01); *B01J 29/84* (2013.01); *B01J 35/10* (2013.01); *B01J 35/109* (2013.01); *B01J 37/30* (2013.01); *C01B 39/026* (2013.01); *C01B 39/24* (2013.01); *C10G 11/18* (2013.01); *B01J 2029/062* (2013.01); *B01J 2229/186* (2013.01); *B01J 2229/40* (2013.01); *B01J 2229/42* (2013.01)

(58) Field of Classification Search
CPC ........ B01J 29/088; B01J 29/084; B01J 29/80; B01J 2229/40; B01J 2229/186; B01J 2229/42; B01J 35/10; B01J 35/109; B01J 37/30; C01B 39/24; C01B 39/026
USPC ........ 502/65, 73, 79, 85; 423/700, 701, 714, 423/715
See application file for complete search history.

(56) References Cited

U.S. PATENT DOCUMENTS

| 4,584,287 | A | 4/1986 | Ward |
|---|---|---|---|
| 5,006,497 | A | 4/1991 | Herbst et al. |
| 5,340,957 | A | 8/1994 | Clark |
| 5,997,729 | A | 12/1999 | Itoh |
| 2006/0199725 | A1 | 9/2006 | Du et al. |
| 2007/0072767 | A1 | 3/2007 | Xu et al. |
| 2008/0261802 | A1 | 10/2008 | Du et al. |
| 2015/0011378 | A1 | 1/2015 | Gao et al. |

FOREIGN PATENT DOCUMENTS

| CN | 1217231 | 5/1999 |
|---|---|---|
| CN | 1296860 | 5/2001 |
| CN | 1075466 | 11/2001 |
| CN | 1202007 | 5/2005 |
| CN | 1683474 | 10/2005 |

(Continued)

OTHER PUBLICATIONS

Machine translation of CN 102133542, Shanxiang et al., Jul. 27, 2011.*
Machine translation of CN 101284243, Lingping et al., Oct. 15, 2008.*
Office action dated Jun. 9, 2015 for corresponding Japanese Patent Application No. 2014-546273.

(Continued)

*Primary Examiner* — Elizabeth Wood
(74) *Attorney, Agent, or Firm* — Loza & Loza, LLP; Michael Fedrick

(57) ABSTRACT

The present invention relates to a heavy oil catalytic cracking catalyst having a high yield of light oil and preparation methods thereof. The catalyst comprises 2 to 50% by weight of a magnesium-modified ultra-stable rare earth type Y molecular sieve, 0.5 to 30% by weight of one or more other molecular sieves, 0.5 to 70% by weight of clay, 1.0 to 65% by weight of high-temperature-resistant inorganic oxides, and 0.01 to 12.5% by weight of rare earth oxide. The magnesium-modified ultra-stable rare earth type Y molecular sieve is obtained by the following manner: the raw material, a NaY molecular sieve, is subjected to a rare earth exchange, a dispersing pre-exchange, a magnesium salt exchange modification, an ammonium salt exchange for sodium reduction, a second exchange and a second calcination. The catalyst provided in the present invention is characteristic in its high conversion capacity of heavy oil and a high yield of light oil.

22 Claims, No Drawings

(56) References Cited

FOREIGN PATENT DOCUMENTS

| | | |
|---|---|---|
| CN | 1733362 | 2/2006 |
| CN | 1307098 | 3/2007 |
| CN | 1322928 | 6/2007 |
| CN | 101088613 | 12/2007 |
| CN | 101190416 | 6/2008 |
| CN | 101284243 | 10/2008 |
| CN | 100497175 | 6/2009 |
| CN | 101676027 | 3/2010 |
| CN | 102029177 | 4/2011 |
| CN | 102125870 | 7/2011 |
| CN | 102133542 | 7/2011 |
| CN | 101210187 | 9/2011 |
| EP | 1609840 | 12/2005 |
| JP | 2006503689 | 2/2006 |
| JP | 2008535652 | 9/2008 |
| WO | 2013086766 | 6/2013 |

OTHER PUBLICATIONS

Office action dated Dec. 1, 2015 for the corresponding Canadian Patent Application No. 2779312.
Office action dated Jun. 19, 2015 for corresponding Australian Patent Application No. 2012351265.
Second Office Action dated Jun. 20, 2016 for counterpart Canadian patent application No. 2,862,131.
International Search Report, International Patent Application No. PCT/CN2012/000507, dated Sep. 27, 2012.
International Written Opinion, International Patent Application No. PCT/CN2012/000507, dated Sep. 27, 2012.
Search Report, Chinese Patent Application No. 201110419856.9, dated Nov. 24, 2011.
Second Office Action dated Mar. 1, 2016 for counterpart Japanese patent application No. 2014-546273.
Canadian Patent Appln. No. 2,862,131. Third Office Action dated (Feb. 16, 2017).

* cited by examiner

HIGH LIGHT RECEIVED HEAVY OIL CATALYTIC CRACKING CATALYST AND PREPARATION METHOD THEREFOR

FIELD OF TECHNOLOGY

The present invention relates to a heavy oil catalytic cracking catalyst with a high light-oil yield and a high heavy-oil-conversion capability and a preparation method thereof, and more specifically, to a heavy oil catalytic cracking catalyst with a high light-oil yield suitable for residual oil blending and a preparation method thereof.

BACKGROUND ART

Catalytic cracking apparatuses are crucial means for crude oil refining, and the economic benefits of refineries depend on the overall product distribution of these apparatuses, especially the on the yield of high-value light oil products. Recently, because of the growing trend towards heavier crude oils, a higher heavy-oil-conversion capacity and a higher yield of light oil are demanded for FCC catalysts. As a critical active component determining the reaction selectivity of heavy oil cracking catalysts, a type Y molecular sieve with high target product selectivity and high active stability has been the key technical subject of research in the field of catalysis.

To pursue a high-value light oil yield and improve target product selectivity, elements such as magnesium and phosphorous are used both domestically and abroad to modify and adjust the molecular sieve to have suitable acidity, so as to control the ratio between different reactions during the cracking process, reduce further cracking of light oil, and improve the yield of light oil.

Patent CN1683474A describes a preparation method of a co-catalyst that improves the yield of the target product diesel, comprising steps of calcinating kaolin at 900° C. for its in situ crystallization into a type Y zeolite co-catalyst, and subsequently subjecting it to an exchange modification by using salts of magnesium, rare earth and/or ammonium so as to produce a co-catalyst having a high diesel yield. Stability is not described with regard to this method.

Patent CN1217231A describes a preparation method of a phosphorous-containing faujasite catalyst that improves the yield of the target product diesel, comprising steps of thoroughly mixing a faujasite having less than 5% by weight of $Na_2O$, with or without rare earth, and an aqueous solution of a phosphorous-containing compound, then allowing the mixture to stand for 0 to 8 hours, performing drying and calcination to obtain a phosphorous-containing faujasite, and then producing a catalyst with a high diesel yield by a semi-synthetic process. Stability is not described with regard to this method either.

Extensive investigations have been carried out in domestic and abroad research institutions in order to improve the cracking activity and activity stability of type Y molecular sieves. Currently, it is largely agreed that the framework structural stability and the activity stability of molecular sieves can be improved by localizing as many rare earth ions as possible in sodalite cages in the process of rare earth modification of molecular sieves so as to suppress dealumination of the molecular sieve framework during steam aging. Patent ZL200410058089.3 describes a method for preparing rare earth-modified type Y molecular sieves, comprising steps of adjusting the pH of the system to 8-11 using an alkali solution after completion of the rare earth exchange reaction, and then carrying out conventional subsequent treatment processes. In the molecular sieves prepared by this method, rare earth ions are completely located in small cages (sodalite cages). Patent ZL200410058090.6 describes the reaction performance of the molecular sieves of ZL200410058089.3, wherein the catalyst reaction results show that localization of rare earth metals in sodalite cages improves the structural stability and the activity stability of the molecular sieves, manifested in that the heavy oil conversion capacity of the catalyst is greatly improved, although this catalyst has poor coke selectivity.

US patents like U.S. Pat. Nos. 5,340,957 and 4,584,287 describe a method for modifying type Y molecular sieves, comprising steps of modifying the raw material, i.e. a NaY molecular sieve, via an exchange reaction with rare earth and/or Group VIII elements, and then subjecting it to a hydrothermal treatment to afford an ultra-stable rare earth type Y molecular sieve having high stability. Localization of the rare earth ions or grain distribution is not described with regard to the method.

Chinese patent ZL97122039.5 describes a preparation method of ultra-stable Y zeolites, comprising steps of putting a Y zeolite into contact with an acid solution and an ammonium-containing solution, and subjecting them to a high-temperature steam treatment, wherein the amount of the acid used is 1.5 to 6 moles of hydrogen ions per mole of framework aluminum, the concentration of the acid solution is 0.1 to 5 N, the Y zeolite is kept in contact with the acid solution at a temperature of 5 to 100° C. for a duration of 0.5 to 72 h, and the weight ratio between the Y zeolite and the ammonium ion is 2 to 20. The modification method in accordance with this patent requires addition of an ammonium-containing solution for the purpose of lowering the sodium oxide content in the molecular sieve or reducing the damage to the molecular sieve structure caused by acidic gases during calcination. However, this technique has the following technical disadvantages: 1) since a large number of ammonium ions are added in the preparation process, ammonium-containing ions eventually enter the atmosphere or waste water, increasing ammonia nitrogen pollution and the cost for pollution control; 2) the method of this patent is unable to solve the issue of particle agglomeration in molecular sieves, which issue reduces specific surface area and pore volume of the molecular sieve and increases the obstruction in the pore channel during exchange in the molecular sieve, making it difficult to accurately and quantitatively localize the modifying element in the cages of the molecular sieve; 3) moreover, in this patent it is further mentioned that rare earth ions may also be introduced by ion exchange, during or after the contact between the Y zeolite and the ammonium-containing solution, and that during the ion exchange, ammonium ions compete with rare earth ions and preferentially take up the positions intended for rare earth ions, thereby hindering rare earth ions from entering the cages of the molecular sieve by exchange, and also lowering the utilization of rare earth ions.

Chinese patent ZL02103909.7 describes a method for preparing rare earth-containing ultra-stable Y molecular sieves by subjecting a NaY molecular sieve to one exchange process and one calcination process, characterized in that the NaY molecular sieve is placed in an ammonium-containing solution and subjected to chemical dealumination at 25 to 100° C. for 0.5 to 5 h, wherein the chemical dealumination chelating agent contains oxalic acid and/or oxalate salts, a rare earth solution is then introduced under stirring to produce a rare earth precipitate that contains rare earth oxalate, and the precipitate is filtered and washed to give a filter cake, followed by a hydrothermal treatment to afford the molecular sieve product. Although the molecular sieve prepared by this method has certain resistance to vanadium contamination, it has relatively low activity stability and cracking activity, and is insufficient to meet the requirement set out by the growing trend towards crude oils having higher density and poorer quality. This issue is mainly attributed to the distribution of rare earth ions in the supercages and sodalite cages of the molecular sieve during modification. This method demonstrates that rare earth ions are present in the molecular sieve system in two forms, i.e., a part of the rare earth enters sodalite cages in an ionic form, while the other part is scattered over the surface of the molecular sieve as an independent phase of rare earth oxide (the precursor of which is rare earth oxalate and is converted into rare earth oxide after subsequent calcination). Such distribution reduces the stabilizing and supporting effect of rare earth ions on the molecular sieve structure. Furthermore, this method also poses a remarkable problem of ammonium nitrogen pollution, and the oxalic acid or oxalate salts added are also toxic and detrimental to the environment and human.

Chinese patent 200510114495.1 describes a method for increasing the rare earth content in ultra-stable type Y zeolites. In this method, an ultra-stable type Y zeolite and an acidic solution at a concentration of 0.01 to 2 N are sufficiently mixed in a solid-to-liquid ratio of 4~20 at a temperature of 20 to 100° C., treated for 10 to 300 minutes, washed and filtered, then subjected to rare earth ion exchange upon addition of a rare earth salt solution, and then washed, filtered and dried after the exchange, to afford a rare earth ultra-stable type Y zeolite. In this invention, a type Y molecular sieve obtained from water-vapor ultra-stabilization calcination is used as the raw material and subjected to a second exchange and a second calcination for chemical modification, but no investigation on dispersibility of molecular sieve particles is involved.

CN200410029875.0 discloses a preparation method of a rare earth ultra-stable type Y zeolite, characterized in that, in this method, a NaY molecular sieve is subjected to ion exchange with an inorganic ammonium solution first, and then subjected to a water vapor ultra-stabilization treatment to obtain a "one-exchange one-calcination" product; the "one-exchange one calcination" product is then added into a mixed solution of a rare earth salt and citric acid or a mixed solution of an inorganic ammonium salt, a rare earth salt and citric acid, and subjected to an exchange reaction at a certain temperature; and, after completion of the reaction, the molecular sieve slurry is filtered, washed, and eventually calcinated at 450 to 750° C. in air or under a 100% water vapor atmosphere for 0.5 to 4 hours. In this technique, the rare earth modification involves a second exchange modification of the "one-exchange one-calcination" product that serves as the raw material. Because of the lattice contraction in the molecular sieve after the "one-exchange one-calcination", fragmental aluminum inside the pores clogs the pore channels, increasing the hindrance to rare earth ion exchange, which renders it difficult to accurately localize rare earth ions in sodalite cages.

In order to improve the activity stability of type Y molecular sieves and also improve their selectivity for target products, the present invention employs a precise localization technique for rare earth ions to prepare a type Y molecular sieve with high activity stability and structural stability, which is then modified with magnesium and adjusted to have suitable acidity, so that the ratio between different reactions in the cracking process is under control and the yield of light oil is improved.

SUMMARY OF THE INVENTION

An objective of the present invention is to provide a catalytic cracking catalyst with a high light-oil yield and high heavy-oil-conversion efficiency and a preparation method thereof. The catalyst is characterized by a high heavy-oil-conversion capacity, a high yield of light oil, and moderate coke selectivity.

The present invention provides a catalytic cracking catalyst with a high light-oil yield and high heavy-oil-conversion efficiency, characterized in that, in the catalyst composition, there are 2 to 50% by weight of a magnesium-modified ultra-stable rare earth type Y molecular sieve, 0.5 to 30% by weight of one or more other molecular sieves, 0.5 to 70% by weight of clay, 1.0 to 65% by weight of high-temperature-resistant inorganic oxides, and 0.01 to 12.5% by weight of rare earth oxide; wherein the magnesium-modified ultra-stable rare earth type Y molecular sieve means a magnesium-modified ultra-stable rare earth type Y molecular sieve having 0.2 to 5% by weight of magnesium oxide, 1 to 20% by weight of rare earth oxide, not more than 1.2% by weight of sodium oxide, a crystallinity of 46% to 63%, and a lattice parameter of 2.454 nm to 2.471 nm. The preparation process of the magnesium-modified ultra-stable rare earth type Y molecular sieve includes a dispersing pre-exchange, a rare-earth exchange and a magnesium salt exchange modification, wherein the magnesium salt exchange modification is performed after the rare-earth exchange and the dispersing pre-exchange; the order of the rare earth exchange and the dispersing pre-exchange is not limited, and the rare earth exchange and the dispersing pre-exchange are consecutively conducted without a calcination process therebetween. The dispersing pre-exchange refers to a process of adjusting the molecular sieve slurry's concentration to a solid content of 80 to 400 g/L and adding 0.2 to 7% by weight of a dispersing agent to carry out dispersing pre-exchange at an exchange temperature of 0 to 100° C. for 0.1 to 1.5 h. The dispersing agent in accordance with the dispersing pre-exchange process is selected from one or more of *sesbania* gum powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch. No ammonium salt is used in the rare earth exchange or the dispersing pre-exchange.

The present invention further provides a preparation method of the heavy oil catalytic cracking catalyst, comprising:
(1) preparation of a magnesium-modified ultra-stable rare earth type Y molecular sieve, wherein the raw material, a NaY molecular sieve (preferably with a silica-to-alumina ratio greater than 4.0, and a crystallinity greater than 70%), is subjected to a rare earth exchange and a dispersing pre-exchange, then the molecular sieve slurry is filtered, washed, and subjected to a first calcination to afford a "one-exchange one-calcination" rare earth sodium Y molecular sieve, wherein the order of the rare earth exchange and the dispersing pre-exchange is not limited; and the "one-exchange one-calcination" rare earth sodium Y molecular sieve is then subjected to an ammonium salt exchange for sodium reduction, a magnesium salt exchange modification and a second calcination so as to obtain an ultra-stable rare earth type Y molecular sieve provided in accordance with the present invention; wherein the addition order of the ammonium salt and the magnesium salt is not limited; the second calcination is performed after the ammonium salt exchange for sodium reduction; and the magnesium salt exchange modification can be performed before, after, or both before and after the second calcination; and (2) preparation of the heavy oil catalyst, wherein the above magnesium-modified ultra-stable rare earth type Y molecular sieve component, clay, and a precursor of a high-temperature resistant inorganic oxide are mixed, homogenized, shaped by spraying, calcinated and washed, to obtain the catalyst product.

In step (1) of the preparation process of the heavy oil catalytic cracking catalyst according to the present invention, i.e., in the process of obtaining the magnesium-modified ultra-stable rare earth type Y molecular sieve, between the rare earth exchange and the dispersing pre-exchange of the NaY molecular sieve, the molecular sieve slurry may or may not be washed and filtered. During the rare earth exchange, the $RE_2O_3$/Y-zeolite (by mass) is preferably 0.005 to 0.25, most preferably 0.01 to 0.20; the exchange temperature is 0 to 100° C., preferably 60 to 95° C.; the exchange pH is 2.5 to 6.0, preferably 3.5 to 5.5; and the exchange time is 0.1 to 2 h, preferably 0.3 to 1.5 h. During the dispersing pre-exchange, the amount of the dispersing agent added is 0.2 to 7% by weight, preferably 0.2 to 5% by weight; the exchange temperature is 0 to 100° C., preferably 60 to 95° C.; and the exchange time is 0.1 to 1.5 h. The molecular sieve slurry after modification is filtered and washed to give a filter cake, which is then dried by flash evaporation to make the water content thereof between 30% and 50%, and eventually calcinated to afford the "one-exchange one-calcination" ultra-stable rare earth sodium Y molecular sieve, wherein general conditions may be used for the calcination, for example, a calcination at 350 to 700° C. under 0 to 100% water vapor for 0.3 to 3.5 h, preferably at 450 to 650° C. under 15 to 100% water vapor for 0.5 to 2.5 h. The "one-exchange one-calcination" ultra-stable rare earth sodium Y molecular sieve is then subjected to a second exchange and a second calcination to afford a "two-exchange two-calcination" ultra-stable rare earth sodium Y molecular sieve.

The second exchange and the second calcination in the present invention are the ammonium exchange for sodium reduction and the ultra-stabilization process well known in the art, and are not limited in the present invention. The "one-exchange one-calcination" rare earth sodium Y molecular sieve may be modified first via ammonium exchange for sodium reduction, with or without filtration and washing thereafter, and then is subjected to a magnesium salt exchange modification and a second calcination. Alternatively, the "one-exchange one-calcination" rare earth sodium Y molecular sieve may be subjected first to an ammonium exchange for sodium reduction and a second calcination, and then the "second-exchange second-calcination" ultra-stable rare earth type Y molecular sieve is used as the raw material and subjected to a magnesium salt exchange modification, with or without filtration and washing thereafter, so as to obtain a molecular sieve provided in accordance with the present invention. Alternatively, an amount of magnesium salt may be divided into two portions, which are used to perform magnesium salt exchange modifications on a "one-exchange one-calcination" rare earth sodium Y molecular sieve and a "second-exchange second-calcination" ultra-stable rare earth type Y molecular sieve as raw materials, respectively, and Mg-REUSY molecular sieves (also referred to as magnesium-modified ultra-stable rare earth type Y molecular sieves) are finally obtained.

In the present invention, the process of magnesium salt exchange modification may be a well-known method for magnesium salt exchange modification in the art, which may be, for example, as follows: a "one-exchange one-calcination" ultra-stable rare earth sodium Y molecular sieve is added into deionized water, and the solid content thereof is adjusted to 100 to 400 g/L, wherein the $NH_4^+$/Y zeolite (by mass) is 0.02 to 0.40, preferably 0.02 to 0.30; the $Mg^{2+}$/Y zeolite (by mass) is 0.002 to 0.08, preferably 0.002 to 0.04; and the pH is 2.5 to 5.0, preferably 3.0 to 4.5; after a reaction at 60 to 95° C. for 0.3 to 1.5 h, the molecular sieve slurry is filtered and washed, and the resultant filter cake is calcinated at 450 to 700° C. under 0 to 100% water vapor for 0.3 to 3.5 h, preferably 0.5 to 2.5 h, so as to obtain a magnesium-modified ultra-stable rare earth type Y molecular sieve provided in accordance with the present invention.

The process of magnesium salt exchange modification may also be as follows: a "one-exchange one-calcination" ultra-stable rare earth sodium Y molecular sieve is added into deionized water, and the solid content thereof is adjusted to 100 to 400 g/L, wherein the $Mg^{2+}$/Y zeolite (by mass) is 0.002 to 0.08, preferably 0.002 to 0.04, and the pH is 2.5 to 5.0, preferably 3.0 to 4.5; after a reaction at 60 to 95° C. for 0.3 to 1.5 h, the molecular sieve slurry is or is not filtered and washed, and then modified via an ammonium salt exchange for sodium reduction; the solid content is adjusted to 100 to 400 g/L, wherein the $NH_4^+$/Y zeolite (by mass) is 0.02 to 0.40, preferably 0.02 to 0.30; and the pH is 2.5 to 5.0, preferably 3.0 to 4.5; after a reaction at 60 to 95° C. for 0.3 to 1.5 h, the molecular sieve slurry is filtered and washed, and the resultant filter cake is calcinated at 450 to 700° C. under 0 to 100% water vapor for 0.3 to 3.5 h, preferably 0.5 to 2.5 h, so as to afford a magnesium-modified ultra-stable rare earth type Y molecular sieve provided in accordance with the present invention.

The process of magnesium salt exchange modification may alternatively be as follows: a "one-exchange one-calcination" ultra-stable rare earth sodium Y molecular sieve is added into deionized water, and the solid content thereof is adjusted to 100 to 400 g/L, wherein the $NH_4^+$/Y zeolite (by mass) is 0.02 to 0.40, preferably 0.02 to 0.30; and the pH is 2.5 to 5.0, preferably 3.0 to 4.5; after a reaction at 60 to 95° C. for 0.3 to 1.5 h, the molecular sieve slurry is or is not filtered and washed, and then subjected to a magnesium modification exchange, wherein the $Mg^{2+}$/Y zeolite (by mass) is 0.002 to 0.08, preferably 0.002 to 0.04; and the pH is 2.5 to 5.0, preferably 3.0 to 4.5; after a reaction at 60 to 95° C. for 0.3 to 1.5 h, the molecular sieve slurry is filtered and washed, and the resultant filter cake is calcinated at 450 to 700° C. under 0 to 100% water vapor for 0.3 to 3.5 h, preferably 0.5 to 2.5 h, to afford a magnesium-modified ultra-stable rare earth type Y molecular sieve provided in accordance with the present invention.

The process of magnesium salt exchange modification may also be as follows: a "one-exchange one-calcination" ultra-stable rare earth sodium Y molecular sieve is added into deionized water; and the solid content thereof is adjusted to 100 to 400 g/L, wherein the $NH_4^+$/Y zeolite (by mass) is 0.02 to 0.40, preferably 0.02 to 0.30; and the pH is 2.5 to 5.0, preferably 3.0 to 4.5; after a reaction at 60 to 95° C. for 0.3 to 1.5 h, the molecular sieve slurry is filtered and washed, and the resultant filter cake is calcinated at 450 to 700° C. under 0 to 100% water vapor for 0.3 to 3.5 h, preferably 0.5 to 2.5 h, to afford a "two-exchange two-calcination" ultra-stable rare earth type Y molecular sieve; subsequently, the "two-exchange two-calcination" ultra-stable rare earth type Y molecular sieve is added into deionized water, and the solid content is adjusted to 100 to 400 g/L, wherein the $Mg^{2+}$/Y zeolite (by mass) is 0.002 to 0.08, preferably 0.002 to 0.04; and the pH is 2.5 to 5.0, preferably 3.0 to 4.5; after a reaction at 60 to 95° C. for 0.3 to 1.5 h, the molecular sieve is or is not filtered and washed, so as to afford a magnesium-modified ultra-stable rare earth type Y molecular sieve provided in accordance with the present invention.

In the "one-exchange one-calcination" process for the ultra-stable rare earth type Y molecular sieve according to the present invention, tank-type exchange, belt-type exchange and/or filter cake exchange may be employed in the exchange processes of the rare earth exchange and the dispersing pre-exchange. The rare earth exchange may be carried out in which the rare earth compound solution may be divided into several portions, provided that the total amount of rare earth is not changed, to undergo tank-type exchange, belt-type exchange and/or filter cake exchange, i.e., multiple exchanges. Similarly, in the dispersing pre-exchange, the dispersing agent may be divided into several portions, provided that the total amount of the dispersing agent is not changed, to undergo tank-type exchange, belt-type exchange and/or filter cake exchange. When the rare earth exchange and the dispersing pre-exchange are multiple exchanges, these two types of exchange may be carried out alternately.

The rare earth compound according to the present invention is rare earth chloride, rare earth nitrate or rare earth sulfate, preferably rare earth chloride or rare earth nitrate.

The rare earth according to the present invention may be lanthanum-rich or cerium-rich rare earth, or may be pure lanthanum or pure cerium rare earth.

The magnesium salt according to the present invention may be magnesium chloride, magnesium nitrate, or magnesium sulfate, preferably magnesium chloride or magnesium nitrate.

The dispersing agent in the dispersing pre-exchange process according to the present invention is selected from one or more of, preferably two or more of sesbania gum powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch.

The other molecular sieves in the composition of the catalyst according to the present invention are one or more selected from type Y zeolite, L zeolite, ZSM-5 zeolite, β zeolite, aluminum phosphate zeolite, Ω zeolite, preferably type Y zeolite, ZSM-5 zeolite and β zeolite, or these zeolites having undergone a conventional physical or chemical modification, including HY, USY, REY, REHY, REUSY, H-ZSM-5, and Hβ.

The clay according to the present invention is one or more selected from kaolin, halloysite, montmorillonite, sepiolite, perlite and the like. The high-temperature-resistant inorganic oxide is one or more selected from $Al_2O_3$, $SiO_2$, $SiO_2$—$Al_2O_3$, and $AlPO_4$, and the precursor thereof includes silica-alumina gel, silica sol, alumina sol, silica-alumina composite sol, and pseudoboehmite.

The spraying condition according to the present invention is the conventional operation condition for preparation of cracking catalysts and is not limited in the present invention. The post-treatment process is the same as that in the prior art, including catalyst calcination, washing, drying, etc., wherein the calcination is preferably calcination of a sprayed microsphere sample at 200 to 700° C., preferably 300 to 650° C., for 0.05 to 4 h, preferably 0.1 to 3.5 h, and the washing condition is preferably a water/catalyst weight ratio of 0.5 to 35, a washing temperature of 20 to 100° C., and a duration of 0.1 to 0.3 h.

DETAILED DESCRIPTION OF PREFERRED EMBODIMENTS

Specification of Raw Materials Used in Examples

1. NaY molecular sieves: NaY-1 (the silica/alumina ratio: 4.8, crystallinity: 92%), NaY-2 (the silica/alumina ratio: 4.1, crystallinity: 83%), manufactured by Lanzhou Petrochemical Corporation, Catalyst Division.
2. Ultra-stable "one-exchange one-calcination" molecular sieve samples: crystallinity being 60%, sodium oxide being 4.3 m %, manufactured by Lanzhou Petrochemical Corporation, Catalyst Division.
3. Rare earth solutions: rare earth chloride (rare earth oxide: 277.5 g/L), rare earth nitrate (rare earth oxide: 252 g/L), both of which are industrial grade and purchased from Lanzhou Petrochemical Corporation, Catalyst Division.
4. *Sesbania* gum powder, boric acid, urea, ethanol, polyacrylamide, oxalic acid, adipic acid, acetic acid, formic acid, hydrochloric acid, nitric acid, citric acid, salicylic acid, tartaric acid, starch, magnesium chloride and magnesium nitrate, all of which are chemically pure; ammonium chloride, ammonium nitrate, ammonium sulfate, and ammonium oxalate, all of which are industrial grade.
5. Pseudoboehmite (Loss on Ignition: 36.2%), kaolin (Loss on Ignition: 16.4%), halloysite (Loss on Ignition: 21.4%), montmorillonite (Loss on Ignition: 15.8%), perlite (Loss on Ignition: 17.6%) (all of which are solid); alumina sol with an alumina content of 23.0 weight %; silica sol with a silica content of 24.5 weight %; all of which are industrial grade.
6. REY, REHY, USY, REUSY molecular sieves, all of which are industrial grade, manufactured by Lanzhou Petrochemical Corporation, Catalyst Division; β zeolite, industrial grade, manufacture by Fushun Petrochemical Corporation; H-ZSM-5, industrial grade, manufactured by Shanghai Fudan University.

EXAMPLE 1

To a reaction kettle equipped with a heating mantle, 3000 g NaY-1 molecular sieve (dry basis) and deionized water were consecutively added and blended into a slurry having a solid content of 100 g/L, and 180 g citric acid was then added thereto to carry out a dispersing pre-exchange. The temperature was raised to 85° C., an exchange reaction was carried out for 0.5 h, and then 1.08 L rare earth chloride was added. The system pH was adjusted to 4.5, the temperature was elevated to 85° C., and an exchange reaction was carried out for 1 h, followed by filtration and washing. The resultant filter cake was dried by flash evaporation such that the moisture content thereof was 30% to 50%, and was finally calcinated under 40% water vapor at 540° C. for 1.5 h to produce a "one-exchange one-calcination" ultra-stable rare earth sodium Y molecular sieve. To a reaction kettle equipped with a heating mantle, 500 g of the "one-exchange one-calcination" ultra-stable rare earth sodium Y molecular sieve (dry basis) and a certain amount of deionized water were added to prepare a slurry having a solid content of 145 g/L, to which 80 g ammonium sulfate was added. The system pH was adjusted to 3.5, the temperature was raised to 90° C., and an exchange reaction was carried out for 1.2 h, followed by filtration and washing. The filter cake was mashed to produce a slurry having a solid content of 120 g/L, to which 127 g magnesium chloride hexahydrate was added. The temperature was raised to 90° C., and an exchange reaction was carried out for 0.8 h, followed by filtration and washing. The filter cake was calcinated under 50% water vapor at 650° C. for 2 h to produce a "two-exchange two-calcination" rare earth ultra-stable Y molecular sieve, designated as Modified Molecular Sieve A-1.

To a reaction kettle with water bath heating, 4.326 L water, 1038 g kaolin, 971 g alumina and 63.5 mL HCl were added and thoroughly mixed, and were stirred for 1 hour, followed by consecutive addition of 482 g Modified Molecular Sieve A-1, 63 g H-ZSM-5, and 755 g REUSY which were then thoroughly mixed. 1500 g alumina sol was slowly added for gelation, and was then shaped by spraying. The resultant microspheres were calcinated at 400° C. for 0.5 hours. 2 kg calcinated microspheres were weighed, to which 15 kg deionized water was added, followed by washing at 60° C. for 15 min, and were filtered and dried to produce a cracking catalyst prepared in accordance with the present invention, designated as A.

EXAMPLE 2

To a reaction kettle equipped with a heating mantle, 3000 g NaY-1 molecular sieve (dry basis) and a certain amount of deionized water were consecutively added and blended into a slurry having a solid content of 360 g/L, followed by addition of 0.82 L rare earth nitrate thereto. The system pH was adjusted to 3.3, the temperature was raised to 80° C., and an exchange reaction was carried out for 1.5 h, followed by filtration and washing. The resultant filter cake was placed in a reaction kettle, to which 202 g polyacrylamide and 30 g salicylic acid were then added. The temperature was then elevated to 78° C. for dispersing exchange, and the exchange reaction was carried out for 0.5 h under stirring. The resultant filter cake was dried by flash evaporation such that the moisture content thereof was 30% to 50%, and was finally calcinated under 30% water vapor at 630° C. for 1.8 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 370 g/L, to which 200 g ammonium sulfate was added. The system pH was adjusted to 3.6, the temperature was raised to 90° C., and an exchange reaction was carried out for 1.2 h, followed by filtration and washing. The filter cake was calcinated under 20% water vapor at 600° C. for 0.5 h to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added to prepare a slurry having a solid content of 120 g/L, to which 42 g magnesium chloride hexahydrate was added. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve B-1.

To a reaction kettle with water bath heating, 4.603 L water, 1031 g kaolin, 976 g pseudoboehmite and 90.8 mL HCl were added and thoroughly mixed, and were stirred for 1 hour, followed by consecutive addition of 352 g Modified Molecular Sieve B-1, 129 g β zeolite, and 806 g REHY which were then thoroughly mixed. 1304 g alumina sol was slowly added for gelation, and was then shaped by spraying. The resultant microspheres were calcinated at 400° C. for 1.0 h. 2 kg calcinated microspheres were weighed, to which 20 kg deionized water was added and stirred till uniform, followed by washing at 35° C. for 40 min, and were filtered and dried to produce a cracking catalyst prepared by the present invention, designated as B.

EXAMPLE 3

To a reaction kettle equipped with a heating mantle, 3000 g NaY-1 molecular sieve (dry basis) and a certain amount of deionized water were consecutively added and blended into a slurry having a solid content of 350 g/L. 42 g citric acid and 28 g *sesbania* gum powder were then added thereto. The temperature was raised to 82° C., and an exchange reaction was carried out for 1.3 h under stirring. When the reaction was completed, 0.56 L rare earth nitrate was added, and an exchange reaction was carried out at 85° C. for 0.8 h. Subsequently, the molecular sieve slurry was filtered and subjected to a belt-type exchange under the following belt-type exchange conditions: the temperature of the rare earth nitrate solution was raised to 88° C., the pH for exchange was 4.7, the rare earth nitrate was added in a $RE_2O_3/Y$ zeolite ratio (by mass) of 0.04, and the vacuum degree in the belt-type filter was 0.03. The resultant filter cake was then dried by flash evaporation such that the moisture content thereof was 30% to 50%, and was finally calcinated under 80% water vapor at 530° C. for 1.5 h to produce a "one-exchange one-calcination" ultra-stable rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 100 g ammonium sulfate was added. The system pH was adjusted to 4.0, the temperature was raised to 90° C., and an exchange reaction was carried out for 1 h, followed by filtration and washing. The filter cake was made into a slurry having a solid content of 120 g/L, to which 208 g magnesium nitrate hexahydrate was added. The temperature was raised to 90° C., and an exchange reaction was carried out for 0.8 h. After oven drying at 150° C. for 3 h, a calcination was carried out under 60% water vapor at 620° C. for 2 h, so as to produce a "two-exchange two-calcination" rare earth ultra-stable Y molecular sieve, designated as Modified Molecular Sieve C-1.

To a reaction kettle with water bath heating, 4.804 L water, 1125 g halloysite, 825 g pseudoboehmite and 51.4 mL HCl were added and thoroughly mixed, and were stirred for 1 hour, followed by consecutive addition of 456 g Modified Molecular Sieve C-1 and 903 g USY which were then thoroughly mixed. 1224 g silica sol was slowly added for gelation, and was then shaped by spraying. The resultant microspheres were calcinated at 600° C. for 0.3 h. 2 kg calcinated microspheres were weighted, to which 15 kg deionized water was added, followed by washing at 80° C. for 30 min, and were filtered and dried to produce a cracking catalyst prepared in accordance with the present invention, designated as C.

EXAMPLE 4

To a reaction kettle equipped with a heating mantle, 3000 g NaY-1 molecular sieve (dry basis) and a certain amount of deionized water were consecutively added and blended into a slurry having a solid content of 190 g/L. 78 g urea and 46 g HCl were then added thereto, and the system pH was adjusted to 6.5. Next, the temperature was raised to 90° C., and an exchange reaction was carried out for 0.6 h under stirring. Subsequently, the molecular sieve slurry was filtered and subjected to a belt-type exchange under the following belt-type exchange conditions: the temperature of the rare earth nitrate solution was raised to 88° C., the pH for exchange was 4.2, the rare earth nitrate was added in a $RE_2O_3/Y$ zeolite ratio (by mass) of 0.12, and the vacuum degree in the belt-type filter was 0.05. The resultant filter cake was then dried by flash evaporation such that the moisture content thereof was 30% to 50%, and was finally calcinated under 100% water vapor at 580° C. for 2 h to produce a "one-exchange one-calcination" ultra-stable rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 160 g ammonium sulfate was added. The system pH was adjusted to 4.0, the temperature was raised to 90° C., and an exchange reaction was carried out for 1 h, followed by filtration and washing. The filter cake was calcinated under 60% water vapor at 620° C. for 2 h to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added to prepare a slurry having a solid content of 120 g/L, to which 169 g magnesium chloride hexahydrate was added. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve D-1.

To a reaction kettle with water bath heating, 4.506 L water, 1082 g kaolin, 971 g alumina and 63.5 ml HCl were added and thoroughly mixed, and were stirred for 1 hour, followed by consecutive addition of 1012 g Modified Molecular Sieve D-1, 63 g ZSM-5 zeolite, and 306 g REUSY which were then thoroughly mixed. 1500 g alumina sol was slowly added for gelation, and was then shaped by spraying. The resultant microspheres were calcinated at 400° C. for 0.5 h. 2 kg calcinated microspheres were weighed, to which 10 kg deionized water was added, followed by washing at 40° C. for 20 min, and were filtered and dried to produce a cracking catalyst prepared by the present invention, designated as D.

COMPARATIVE EXAMPLE 1

A REUSY molecular sieve was prepared by the same method as that shown in Example 2, with the only exception that polyacrylamide and salicylic acid were not added. The resultant ultra-stable rare earth type Y molecular sieve is designated as E-1, and the resultant catalyst is designated as E.

COMPARATIVE EXAMPLE 2

In this comparative example, the molecular sieve preparation method described in CN200510114495.1 was used in order to examine the reaction performance of this molecular sieve. The preparation process of the catalyst was the same as that in Example 2.

3000 g (dry basis) ultra-stable one-exchange one-calcination molecular sieve sample ($Na_2O$ content: 1.4 weight %, $RE_2O_3$ content: 8.6 weight %, lattice parameter: 2.468 nm, relative crystallinity: 62%) produced hydrothermally by the Catalyst Division of Lanzhou Petrochemical Corporation was added into a 3 L aqueous solution of 2N oxalic acid, and was stirred until thoroughly mixed. The temperature was raised to 90 to 100° C., and a reaction was carried out for 1 hour, followed by filtration and washing. The resultant filter cake was placed into 6 L deionized water, to which a 1.46 L solution of rare earth nitrate was added. The temperature was raised to 90 to 95° C., at which a reaction was carried out for 1 hour, followed by filtration and washing. The filter cake was oven dried at 120° C. to afford the molecular sieve sample of this comparative example, designated as F-1.

To a reaction kettle with water bath heating, 4.620 L water, 1024 g kaolin, 971 g pseudoboehmite and 90.8 mL HCl were added and thoroughly mixed, and were stirred for 1 hour, followed by consecutive addition of 338 g Modified Molecular Sieve F-1, 129 g β zeolite, and 806 g REHY which were then thoroughly mixed. 1304 g alumina sol was slowly added for gelation, and was then shaped by spraying. The resultant microspheres were calcinated at 400° C. for 1.0 h. 2 kg calcinated microspheres were weighed, to which 20 kg deionized water was added and stirred till uniform, followed by washing at 35° C. for 40 min, and were filtered and dried to produce a cracking catalyst prepared in connection with the present invention, designated as F.

COMPARATIVE EXAMPLE 3

In this comparative example, the molecular sieve preparation method described in CN97122039.5 was used, and the preparation process of the catalyst was the same as that in Example 3.

To a reaction kettle equipped with a heating mantle, deionized water and 3000 g (dry basis) NaY-1 molecular sieve were added and blended into a slurry having a solid content of 90 g/L. The temperature was raised to 80° C. under stirring, 50 g HCl was added, the temperature was maintained for 8 hours, and then a 1.65 L solution of rare earth chloride and 1200 g solid ammonium chloride were added and stirred for 1 hour. Filtration and washing were performed until no chloride anion was detected. The resultant wet filter cake (with a water content of 47%) was calcinated at 600° C. for 2 hours to afford the molecular sieve sample of this comparative example, designated as G-1.

To a reaction kettle with water bath heating, 4.854 L water, 1125 g halloysite, 825 g pseudoboehmite and 51.4 mL HCl were added and thoroughly mixed, and were stirred for 1 hour, followed by consecutive addition of 406 g Modified Molecular Sieve G-1 and 903 g USY which were then thoroughly mixed. 1224 g silica sol was slowly added for gelation, and was then shaped by spraying. The resultant microspheres were calcinated at 600° C. for 0.3 h. 2 kg calcinated microspheres were weighted, to which 15 kg deionized water was added, followed by washing at 80° C. for 30 min, and were filtered and dried to produce a cracking catalyst prepared in connection with the present invention, designated as G

EXAMPLE 5

To a reaction kettle equipped with a heating mantle, 3000 g NaY-1 molecular sieve (dry basis) and a certain amount of deionized water were consecutively added and blended into a slurry having a solid content of 350 g/L. 42 g citric acid and 28 g *sesbania* gum powder were then added thereto. The temperature was raised to 82° C., and an exchange reaction was carried out for 1.3 h under stirring. When the reaction was completed, 0.56 L rare earth nitrate was added, and an exchange reaction was carried out at 85° C. for 0.8 h. Subsequently, the molecular sieve slurry was filtered and subjected to a belt-type exchange under the following belt-type exchange conditions: the temperature of the rare earth nitrate solution was raised to 88° C., the pH for exchange was 4.7, the rare earth nitrate was added in a $RE_2O_3/Y$ zeolite ratio (by mass) of 0.04, and the vacuum degree in the belt-type filter was 0.03. The resultant filter cake was then dried by flash evaporation such that the moisture content thereof was 30% to 50%, and was finally calcinated under 80% water vapor at 530° C. for 1.5 h to produce a "one-exchange one-calcination" ultra-stable rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 120 g/L, to which 208 g magnesium nitrate hexahydrate was added. The temperature was raised to 90° C., and an exchange reaction was carried out for 0.8 h, followed by filtration and washing. The filter cake was made into a slurry having a solid content of 150 g/L, to which 100 g ammonium sulfate was added. The system pH was adjusted to 4.0, the temperature was raised to 90° C., and an exchange reaction was carried out for 0.8 h. After oven drying at 150° C. for 3 h, a calcination was carried out under 60% water vapor at 620° C. for 2 h, so as to produce a "two-exchange two-calcination" rare earth ultra-stable Y molecular sieve, designated as Modified Molecular Sieve H-1.

To a reaction kettle with water bath heating, 4.506 L water, 1082 g kaolin, 971 g alumina and 63.5 ml HCl were added and thoroughly mixed, and were stirred for 1 hour, followed by consecutive addition of 1012 g Modified Molecular Sieve H-1, 63 g ZSM-5 zeolite, and 306 g REUSY which were then thoroughly mixed. 1500 g alumina sol was slowly added for gelation, and was then shaped by spraying. The resultant microspheres were calcinated at 400° C. for 0.5 h. 2 kg calcinated microspheres were weighed, to which 10 kg deionized water was added, followed by washing at 40° C. for 20 min, and were filtered and dried to produce a cracking catalyst prepared in accordance with the present invention, designated as H.

EXAMPLE 6

To a reaction kettle equipped with a heating mantle, 3000 g NaY-1 molecular sieve (dry basis) and a certain amount of deionized water were consecutively added and blended into a slurry having a solid content of 350 g/L. 42 g citric acid and 28 g *sesbania* gum powder were then added thereto. The temperature was raised to 82° C., and an exchange reaction was carried out for 1.3 h under stirring. When the reaction was completed, 0.56 L rare earth nitrate was added, and an exchange reaction was carried out at 85° C. for 0.8 h. Subsequently, the molecular sieve slurry was filtered and subjected to a belt-type exchange under the following belt-type exchange conditions: the temperature of the rare earth nitrate solution was raised to 88° C., the pH for exchange was 4.7, the rare earth nitrate was added in a $RE_2O_3/Y$ zeolite ratio (by mass) of 0.04, and the vacuum degree in the belt-type filter was 0.03. The resultant filter cake was then dried by flash evaporation such that the moisture content thereof was 30% to 50%, and was finally calcinated under 80% water vapor at 530° C. for 1.5 h to produce a "one-exchange one-calcination" ultra-stable rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 100 g ammonium sulfate and 208 g magnesium nitrate hexahydrate were added. The system pH was adjusted to 4.0, the temperature was raised to 90° C., and an exchange reaction was carried out for 1 h, followed by filtration and washing. After oven drying at 150° C. for 3 h, a calcination was carried out under 60% water vapor at 620° C. for 2 h to produce a "two-exchange two-calcination" rare earth ultra-stable Y molecular sieve, designated as Modified Molecular Sieve I-1.

To a reaction kettle with water bath heating, 4.506 L water, 1082 g kaolin, 971 g alumina and 63.5 ml HCl were added and thoroughly mixed, and were stirred for 1 hour, followed by consecutive addition of 1012 g Modified Molecular Sieve I-1, 63 g ZSM-5 zeolite, and 306 g REUSY which were then thoroughly mixed. 1500 g alumina sol was slowly added for gelation, and was then shaped by spraying. The resultant microspheres were calcinated at 400° C. for 0.5 h. 2 kg calcinated microspheres were weighed, to which 10 kg deionized water was added, followed by washing at 40° C. for 20 min, and were filtered and dried to produce a cracking catalyst prepared in accordance with the present invention, designated as I.

EXAMPLE 7

To a reaction kettle equipped with a heating mantle, 3000 g NaY-1 molecular sieve (dry basis) and a certain amount of deionized water were consecutively added and blended into a slurry having a solid content of 350 g/L. 42 g citric acid and 28 g *sesbania* gum powder were then added thereto. The temperature was raised to 82° C., and an exchange reaction was carried out for 1.3 h under stirring. When the reaction was completed, 0.56 L rare earth nitrate was added, and an exchange reaction was carried out at 85° C. for 0.8 h. Subsequently, the molecular sieve slurry was filtered and subjected to a belt-type exchange under the following belt-type exchange conditions: the temperature of the rare earth nitrate solution was raised to 88° C., the pH for exchange was 4.7, the rare earth nitrate was added in a $RE_2O_3/Y$ zeolite ratio (by mass) of 0.04, and the vacuum degree in the belt-type filter was 0.03. The resultant filter cake was then dried by flash evaporation such that the moisture content thereof was 30% to 50%, and was finally calcinated under 80% water vapor at 530° C. for 1.5 h to produce a "one-exchange one-calcination" ultra-stable rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 100 g ammonium sulfate and 68 g magnesium nitrate hexahydrate were added. The system pH was adjusted to 4.0, the temperature was raised to 90° C., and an exchange reaction was carried out for 1 h, followed by filtration and washing. After oven drying at 150° C. for 3 h, a calcination was carried out under 60% water vapor at 620° C. for 2 h to produce a "two-exchange two-calcination" rare earth ultra-stable Y molecular sieve. 500 g of the "two-exchange two-calcination" rare earth ultra-stable Y molecular sieve (dry basis) and a certain amount of deionized water were made into a slurry having a solid content of 120 g/L, to which 140 g magnesium nitrate hexahydrate was added. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve J-1.

To a reaction kettle with water bath heating, 4.506 L water, 1082 g kaolin, 971 g alumina and 63.5 ml HCl were added and thoroughly mixed, and were stirred for 1 hour, followed by consecutive addition of 1012 g Modified Molecular Sieve J-1, 63 g ZSM-5 zeolite, and 306 g REUSY which were then thoroughly mixed. 1500 g alumina sol was slowly added for gelation, and was then shaped by spraying. The resultant microspheres were calcinated at 400° C. for 0.5 h. 2 kg calcinated microspheres were weighed, to which 10 kg deionized water was added, followed by washing at 40° C. for 20 min, and were filtered and dried to produce a cracking catalyst prepared by the present invention, designated as J.

INDUSTRIAL APPLICABILITY

Method for Analysis and Evaluation Used in the Examples
1. Lattice parameter ($a_0$): X-ray diffraction.
2. Crystallinity ($C/C_0$): X-ray diffraction.
3. Silica-to-alumina ratio: X-ray diffraction.
4. $Na_2O$ content: flame photometry.
5. $RE_2O_3$ content: colorimetry.
6. Microreactor activity: samples were pretreated at 800° C. under 100% water vapor for 4 hours. The raw material for the reaction was Dagang light diesel, the reaction temperature was 460° C., the reaction time was 70 seconds, the catalyst load was 5.0 g, the catalyst/oil ratio was 3.2, and the overall conversion percentage was taken as the microreactor activity.
7. ACE heavy oil microreactor: the reaction temperature was 530° C., the catalyst/oil ratio was 5, and the raw oil was Xinjiang oil blended with 30% vacuum residual oil.

The physical and chemical properties of the ultra-stable rare earth type Y molecular sieves prepared in the Examples and Comparative Examples in connection with the present invention are listed in Table 1. The analysis results show that the new molecular sieves are characterized by good structural stability and a small grain size as compared to those of the Comparative Examples.

TABLE 1

Analysis of physical and chemical properties of molecular sieves

| Item | Molecular Sieve No. | Rare Earth Oxide m % | Sodium Oxide m % | Magnesium Oxide m % | Lattice Parameter nm | Relative Crystallinity % | Retaining of Relative Crystallinity % | Collapse Temperature ° C. | Particle Size Distribution μm D (v, 0.5) | D (v, 0.9) |
|---|---|---|---|---|---|---|---|---|---|---|
| Examples | A-1 | 10.05 | 0 91 | 2.31 | 2.467 | 54 | 72.1 | 1022 | 2.84 | 13.90 |
| | B-1 | 6.92 | 0.92 | 0.92 | 2.465 | 55 | 69.1 | 1020 | 2.73 | 13.69 |
| | C-1 | 8.70 | 0.82 | 3.41 | 2.466 | 54 | 71.3 | 1022 | 2.68 | 13.63 |
| | D-1 | 11.93 | 0.90 | 3.78 | 2.469 | 51 | 72.3 | 1026 | 2.92 | 15.84 |
| | H-1 | 8.69 | 0.80 | 2.65 | 2.464 | 55 | 71.7 | 1019 | 2.66 | 13.52 |
| | I-1 | 8.78 | 0.85 | 3.02 | 2.465 | 54 | 71.0 | 1020 | 2.69 | 13.71 |
| | J-1 | 8.72 | 0.78 | 3.47 | 2.466 | 53 | 71.5 | 1026 | 2.66 | 13.43 |
| Comparative Examples | E-1 | 6.70 | 1.42 | 1.02 | 2.468 | 52 | 52.1 | 1003 | 4.13 | 34.32 |
| | F-1 | 8.27 | 1.60 | 0 | 2.467 | 54 | 54.5 | 1002 | 4.83 | 37.42 |
| | G-1 | 12.86 | 1.82 | 0 | 2.468 | 49 | 56.3 | 1000 | 4.85 | 41.48 |

The results of evaluation of the reaction performance of the catalysts prepared in Examples 1 to 5 and the Comparative Examples are listed in Table 2.

TABLE 2

Evaluation results for the microreactor activity of ACE heavy oil

| | | Catalyst No. | | | | | | | |
|---|---|---|---|---|---|---|---|---|---|
| | | A | B | C | D | J | E | H | G |
| Molecular sieves | | A-1 | B-1 | C-1 | D-1 | J-1 | E-1 | F-1 | G-1 |
| Mass balance m % | Dry gas | 2.85 | 2.73 | 2.72 | 2.88 | 2.71 | 2.86 | 2.90 | 2.84 |
| | Liquified gas | 23.06 | 23.24 | 23.3 | 23.06 | 23.22 | 22.99 | 23.59 | 23.22 |
| | Gasoline | 53.73 | 53.38 | 53.43 | 53.65 | 53.40 | 53.26 | 52.84 | 53.22 |
| | Diesel | 9.89 | 10.12 | 10.21 | 9.93 | 10.37 | 10.01 | 9.69 | 9.99 |
| | Heavy oil | 3.52 | 3.64 | 3.76 | 3.55 | 3.81 | 3.96 | 3.94 | 4.11 |
| | Coke | 6.95 | 6.89 | 6.58 | 6.93 | 6.49 | 6.92 | 7.05 | 6.61 |
| | Total | 100 | 100 | 100 | 100 | 100 | 100 | 100 | 100 |
| Conversion, m % | | 86.59 | 86.24 | 86.03 | 86.52 | 85.82 | 86.03 | 86.38 | 85.90 |
| Total liquid yield, m % | | 86.68 | 86.74 | 86.94 | 86.64 | 86.99 | 86.26 | 86.11 | 86.44 |
| Light oil yield, m % | | 63.62 | 63.50 | 63.64 | 63.58 | 63.77 | 63.27 | 62.52 | 63.21 |

From the evaluation results about the microreactor activity of ACE heavy oil, it can be seen that the catalysts prepared by the methods according to the present invention have a superior heavy-oil-conversion capacity and coke selectivity as compared to comparative catalysts, and also have a total liquid yield and a light oil yield much higher than those of the comparative catalysts. Table 4 shows the evaluation results of a catalyst B riser. As compared to catalyst C, the total liquid yield of the catalyst of the present invention is increased by 1.03%, and the light oil yield thereof is increased by 0.95%, while the gasoline properties are similar.

TABLE 4

Evaluation results of a catalyst riser

| Catalysts | | Comparative catalyst G | Inventive catalyst |
|---|---|---|---|
| Mass balance, ω% | Dry gas (H2-C2) | 1.05 | 1.06 |
| | Liquified gas (C3-C4) | 17.95 | 18.03 |
| | Gasoline (C5-204° C.) | 50.20 | 50.62 |
| | Diesel (204° C.-350° C.) | 16.58 | 17.12 |
| | Heavy oil (>350° C.) | 6.54 | 5.48 |
| | Coke | 7.36 | 7.41 |
| | Loss | 0.30 | 0.28 |
| Selectivity ω% | Conversion | 76.87 | 77.40 |
| | Light oil yield | 66.79 | 67.74 |
| | Total liquid yield | 84.74 | 85.77 |
| Gasoline composition ω% | Normal alkanes | 4.48 | 4.38 |
| | Isoalkanes | 23.75 | 24.32 |
| | Gasoline olefins | 45.05 | 44.43 |
| | Cycloalkanes | 9.97 | 10.00 |
| | Aromatic hydrocarbons | 16.75 | 16.87 |
| | Gasoline MON | 83.40 | 83.39 |
| | Gasoline RON | 93.69 | 93.76 |

One of the major active components of the novel heavy oil catalyst according to the present invention is a magnesium-modified rare earth ultra-stable type Y molecular sieve having high cracking activity stability. In the process of preparing this molecular sieve by rare earth modification, a dispersing agent is used to pre-disperse NaY molecular sieves, thereby lowering the degree of agglomeration of molecular sieve particles, allowing more molecular sieve surface to be in contact with rare earth ions, and reducing the hindrance to rare earth ion exchange. As a result, more rare earth ions are exchanged into molecular sieve cages and then migrate into sodalite cages in the subsequent vapor calcination process, and the structural stability and activity stability of the molecular sieve are improved. By magnesium modification and adjustment to suitable acidity, the ratio between different reactions during cracking is under control, and the yield of light oil is increased. As rare earth ions are located in sodalite cages, there are no rare earth ions present in super-cages or on the surface, thereby reducing the acidic intensity and density in these areas, lowering the coking probability in these active sites, and satisfactorily resolving the conflict between the heavy oil conversion capacity and the coke selectivity of the catalyst.

What is claimed is:

1. A heavy oil catalytic cracking catalyst, characterized in that the catalyst comprises 2% to 50% by weight of a magnesium-modified ultra-stable rare earth type Y molecular sieve, 0.5% to 30% by weight of one or more other molecular sieves, 0.5% to 70% by weight of clay, 1.0% to 65% by weight of high-temperature resistant inorganic oxides, and 0.01% to 12.5% by weight of rare earth oxide,
wherein the magnesium-modified ultra-stable rare earth type Y molecular sieve is a magnesium-modified ultra-stable rare earth type Y molecular sieve having 0.2% to 5% by weight of magnesium oxide, 1% to 20% by weight of rare earth oxide, not more than 1.2% by weight of sodium oxide, a crystallinity of 46% to 63%, and a lattice parameter of 2.454 nm to 2.471 nm;
wherein the magnesium-modified ultra-stable rare earth type Y molecular sieve is prepared by a method comprising:
subjecting a NaY molecular sieve which is used as the raw material to a rare earth exchange and a dispersing pre-exchange, wherein the order of the rare earth exchange and the dispersing pre-exchange is not limited, and wherein the rare earth exchange and the dispersing pre-exchange are consecutively conducted without a calcination process therebetween;
then filtering and washing the molecular sieve slurry and subjecting the molecular sieve slurry to a first calcination to afford a rare earth sodium Y molecular sieve; and
then subjecting the rare earth sodium Y molecular sieve to an ammonium salt exchange for sodium reduction, a magnesium salt exchange modification, and a second calcination, so as to obtain a magnesium-modified ultra-stable rare earth type Y molecular sieve, wherein the addition order of the ammonium salt and the magnesium salt is not limited,
wherein the second calcination is performed after the ammonium salt exchange for sodium reduction, and wherein the magnesium salt exchange modification is performed before, after, or both before and after the second calcination; and
wherein the dispersing pre-exchange refers to a process of adjusting the molecular sieve slurry's concentration to a solid content of 80 to 400 g/L and adding 0.2% to 7% by weight of a dispersing agent to carry out dispersing pre-exchange at an exchange temperature of 0° C. to 100° C. for 0.1 to 1.5 h, the dispersing agent in the dispersing pre-exchange process being selected from one or more of *sesbania* gum powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch; and
wherein no ammonium salt is used in the rare earth exchange or the dispersing pre-exchange.

2. The catalyst according to claim 1, characterized in that the other molecular sieves are selected from the group consisting of one or more of type Y zeolite, L zeolite, ZSM-5 zeolite, β zeolite, aluminum phosphate zeolite, and a Ω zeolite.

3. The catalyst according to claim 1, characterized in that the other molecular sieves are one or more of type Y zeolite, ZSM-5 zeolite, HY, USY, REY, REHY, REUSY, H-ZSM-5, and β zeolite.

4. The catalyst according to claim 1, characterized in that the clay is selected from one or more of kaolin, halloysite, montmorillonite, sepiolite, and perlite.

5. The catalyst according to claim 1, characterized in that the high-temperature-resistant inorganic oxide is selected from one or more of $Al_2O_3$, $SiO_2$, $SiO_2$—$Al_2O_3$, and $AlPO_4$.

6. The catalyst according to claim 1, characterized in that the method of preparing the magnesium-modified ultra-stable rare earth type Y molecular sieve further comprises:
preparing the heavy oil catalyst, wherein the magnesium-modified ultra-stable rare earth type Y molecular sieve, one or more other molecular sieves, clay, and a precursor of a high-temperature-resistant inorganic oxide are mixed, homogenized, shaped by spraying, calcinated and washed to obtain the heavy oil cracking catalyst product.

7. The catalyst according to claim 1, characterized in that during the rare earth exchange, the mass ratio $RE_2O_3/Y$ zeolite is 0.005 to 0.25, the exchange temperature is 0° C. to 100° C., the exchange pH is 2.5 to 6.0, and the exchange time is 0.1 to 2 h.

8. The catalyst according to claim 1, characterized in that during the magnesium salt exchange modification, the amount of magnesium added is 0.2% to 8% by weight, the exchange temperature is 0° C. to 100° C., and the exchange time is 0.3 to 1.5 h.

9. The catalyst according to claim 1, characterized in that during the rare earth exchange, the mass ratio $RE_2O_3/Y$ zeolite is 0.01 to 0.20, the exchange temperature is 60° C. to 95° C., the exchange pH is 3.5 to 5.5, and the exchange time is 0.3 to 1.5 h;

during the dispersing pre-exchange, the amount of the dispersing agent added is 0.2% to 5% by weight, the exchange temperature is 60° C. to 95° C., and the exchange time is 0.1 to 1.5 h; and during the magnesium salt exchange modification, the amount of magnesium added is 0.2% to 8% by weight, the exchange temperature is 60° C. to 95° C., and the exchange time is 0.3 to 1.5 h.

10. The catalyst according to claim 1, characterized in that between the rare earth exchange and the dispersing pre-exchange, the molecular sieve slurry is washed and filtered.

11. The catalyst according to claim 6, characterized in that a tank-type exchange, a belt-type exchange and/or a filter cake exchange is employed for the exchange process of the rare earth exchange or the dispersing pre-exchange.

12. The catalyst according to claim 1, characterized in that in the rare earth exchange, the rare earth compound solution is divided into multiple portions for multiple exchanges, and each of the multiple exchanges is a tank-type exchange, a belt-type exchange and/or a filter cake exchange.

13. The catalyst according to claim 1, characterized in that in the dispersing pre-exchange, the dispersing agent is divided into multiple portions for multiple exchanges, and each of the multiple exchanges is a tank-type exchange, a belt-type exchange and/or a filter cake exchange.

14. The catalyst according to claim 1, characterized in that when the rare earth exchange and the dispersing pre-exchange are carried out alternately multiple times.

15. The catalyst according to claim 1, characterized in that the calcination condition for the first calcination of the molecular sieve is calcination at 350° C. to 700° C. under 0 to 100% water vapor for 0.3 to 3.5 h.

16. The catalyst according to claim 6, characterized in that the precursor of the high-temperature-resistant inorganic oxide is selected from the group consisting of silica-alumina gel, silica sol, alumina sol, silica-alumina composite sol, and pseudoboehmite.

17. The catalyst according to claim 13, characterized in that the rare earth compound is rare earth chloride, rare earth nitrate or rare earth sulfate.

18. The catalyst according to claim 1, wherein the rare earth is lanthanum-rich rare earth, cerium-rich rare earth, pure lanthanum rare earth or pure cerium rare earth.

19. The catalyst according to claim 1, characterized in that the magnesium salt is magnesium chloride, magnesium nitrate, or magnesium sulfate.

20. The catalyst according to claim 6, characterized in that the calcination condition in the step of preparing the heavy oil catalyst is calcinating the sprayed microspheres at 200° C. to 700° C. for 0.05 to 4 hours.

21. The catalyst according to claim 6, characterized in that the calcination condition in the step of preparing the heavy oil catalyst is calcinating the sprayed microspheres at 300° C. to 650° C. for 0.1 to 3.5 hours.

22. The catalyst according to claim 6, characterized in that the washing condition in the step of preparing the heavy oil catalyst is as follows: the weight ratio water/catalyst is 0.5 to 35, the washing temperature is 20° C. to 100° C., and the washing duration is 0.1 to 0.3 hours.

\* \* \* \* \*